United States Patent [19]

Matsumoto et al.

[11] Patent Number: 5,449,996
[45] Date of Patent: Sep. 12, 1995

[54] BATTERY CHARGER WITH IMPROVED CHANGE STOPPING CAPABILITY

[75] Inventors: Toshio Matsumoto; Hideki Watanable, both of Anjo, Japan

[73] Assignee: Makita Corporation, Anjo, Japan

[21] Appl. No.: 107,120

[22] Filed: Aug. 17, 1993

[30] Foreign Application Priority Data

Aug. 20, 1992 [JP] Japan .................................. 4-245621

[51] Int. Cl.6 ........................................... H01M 10/44
[52] U.S. Cl. .................................... 320/20; 320/39
[58] Field of Search ................. 320/20, 30, 31, 27, 320/48, 39, 40

[56] References Cited

U.S. PATENT DOCUMENTS

| | | | |
|---|---|---|---|
| 4,503,378 | 3/1985 | Jones et al. | 320/20 |
| 4,639,655 | 1/1987 | Westhaver et al. | 320/20 X |
| 4,959,604 | 9/1990 | Cuesta | 320/20 |
| 4,998,057 | 3/1991 | Shinohara et al. | 320/40 |
| 5,166,623 | 11/1992 | Ganio | 320/39 X |
| 5,206,579 | 4/1993 | Kawate et al. | 320/20 |
| 5,229,705 | 7/1993 | Kato | 320/20 |
| 5,365,160 | 11/1994 | Leppo et al. | 320/20 X |

FOREIGN PATENT DOCUMENTS

| | | |
|---|---|---|
| 54-118542 | 9/1979 | Japan . |
| 55-141938 | 11/1980 | Japan . |
| 61-288740 | 12/1986 | Japan . |
| 64-47232 | 1/1989 | Japan . |
| 4-58471 | 2/1992 | Japan . |
| 2120472 | 3/1983 | United Kingdom . |

*Primary Examiner*—Peter S. Wong
*Assistant Examiner*—Edward Tso
*Attorney, Agent, or Firm*—Dennison, Meserole, Pollack & Scheiner

[57] ABSTRACT

A battery charger includes a circuit for monitoring a battery voltage during supply of a charging current to a battery, and a circuit for stopping the supply of the charging current when the battery voltage is decreased by a predetermined value after the battery voltage has reached its maximum value. A first predetermined value is adopted as the predetermined value when an increasing tendency of the battery voltage is detected after a predetermined time has elapsed from starting of the charging operation. A second predetermined value is adopted as the predetermined value until the increase tendency of the battery voltage is monitored after the predetermined time has elapsed from starting of the charging operation. The absolute value of the first predetermined value is determined to be smaller than that of the second predetermined value. The predetermined time is determined to be longer than the period of duration of temporary abrupt variation in the battery voltage which may be produced at the beginning of the charging operation of the over-discharged battery.

3 Claims, 7 Drawing Sheets

BATTERY CHARGER WITH IMPROVED CHANGE STOPPING CAPABILITY

BACKGROUND OF THE INVENTION

1. Field of the Invention

The present invention relates to a battery charger for use with a chargeable battery such as a Ni—Cd battery.

2. Description of the Prior Art

Generally, when a battery is charged, its voltage varies with time as indicated by a solid line in FIG. 1. Thus, the battery voltage gradually increases until the battery is fully charged. After the battery has been fully charged, the battery voltage decreases. This means that the battery voltage becomes maximum when the battery has been fully charged. Based on this fact, the prior art has proposed a technique known as $-dV$ method in which, by monitoring the battery voltage during the charging operation, the charging operation is stopped when the battery voltage has been dropped by a predetermined value after reaching the maximum value. Such a technique is disclosed in Japanese Laid-Open Patent Publication Nos. 54-118542 and 55-141938.

However, when an over-discharged battery is charged, the battery voltage varies as indicated by a dashed line A in FIG. 5. Thus, in this case, the battery voltage once abruptly increases immediately after starting the charging operation and then abruptly decreases (see line parts A4 and A6). The battery voltage thereafter gradually decreases (see line part A2) and subsequently increases in the same manner as a normal charging operation (see line part A5). Therefore, if the $-dV$ method is unconditionally adopted for controlling the operation, in case of the charging of the over-discharged battery, the charging operation may be stopped in the course of the temporary abrupt variation of the battery voltage produced immediately after starting the charging operation. For this reason, various techniques have been proposed to prevent an occasion such that the charging operation is accidentally stopped by the abrupt variation produced immediately after starting the charging operation.

Japanese Laid-Open Patent Publication No. 61-288740 proposes a technique to inhibit determination of $-dV$ unless the battery voltage begins to stably increase. Japanese Laid-Open Patent Publication No. 64-47232 or No. 4-58471 proposes technique in which determination of $-dV$ is inhibited as long as the absolute value of the battery voltage is less than a predetermined value, so that the charging operation for the over-discharged battery may not be stopped so long as the battery is short of charge. Here, the predetermined value is selected to a voltage value which may be reached after the battery voltage has begun to stably increase.

As described above, in order to prevent the charging operation from being stopped by the abrupt variation produced immediately after starting the charging operation of the over-charged battery, the prior art techniques have operated to substantially invalidate the determination of $-dV$ until the voltage of the over-discharged battery begins to stably increase or until timing A1 shown in FIG. 5.

However, in case that the determination of $-dV$ is substantially invalidated until the battery begins to stably increase, the charging operation is continued until the inhibition period of determination of $-dV$ is finished even if the battery is an already charged one and has been again charged accidentally. This may cause excessive charge of the battery, and it is not possible to prevent such excessive charge of the battery in case of adoption of this technique.

The stoppage of the charging operation during the abrupt variation produced immediately after starting the charging operation may be prevented if a reference value for the determination of $-dV$ is larger than the value of the abrupt variation produced immediately after the charging operation. However, in this case, the charging operation may be continued for a significant time after the properly-charged battery has been fully charged.

SUMMARY OF THE INVENTION

It is, accordingly, an object of the present invention to provide a battery charger which can be operable to prevent stoppage of a charging operation immediately after starting the charging operation even if the battery is an over-discharged one.

It is a further object of the present invention to provide a battery charger which is operable to prevent excessive charge of a battery even if the battery is an already charged one.

According to the present invention, there is provided a battery charger comprising:

a circuit for monitoring a battery voltage during supply of a charging current to a battery; and a circuit for stopping the supply of the charging current when the battery voltage is decreased by a predetermined value after the battery voltage has reached its maximum value;

the predetermined value being selected from a first predetermined value and a second predetermined value;

the first predetermined value being adopted as the predetermined value when an increasing tendency of the battery voltage is detected after a predetermined time has elapsed from starting of the charging operation;

the second predetermined value being adopted as the predetermined value until the increasing tendency of the battery voltage is monitored after the predetermined time has elapsed from starting of the charging operation;

the absolute value of the first predetermined value being determined to be smaller than the absolute value of the second predetermined value; and the predetermined time being determined to be longer than the period of duration of temporary abrupt variation in the battery voltage which may be produced at the beginning of the charging operation of the over-discharged battery.

The battery charger may preferably include a circuit for monitoring the charging current, and a circuit for incorporating, in place of the battery voltage produced at that time when the charging current is out of a predetermined range, the battery voltage produced just before that time and produced when the charging current is within the predetermined range.

It is also preferable that the battery charger includes a circuit for stopping the supply of the charging current when variation within a second predetermined time has become less than the value of subtraction of a third predetermined value from the maximum variation.

As described in connection with the prior art, when the over-discharged battery is charged, the battery voltage once abruptly increases and then abruptly decreases. The battery voltage thereafter gradually decreases and subsequently gradually increases.

In case of the battery charger of the present invention, the second predetermined value having a larger absolute value is incorporated as a reference value for increasing determination of $-dV$ during the period until the tendency of the battery voltage is detected or until the battery voltage of the over-discharged battery gradually increases after the predetermined time has elapsed. The predetermined time is determined to be longer than the period of duration of the temporary abrupt variations in the battery voltage. Here, the second predetermined value is permitted to have a value larger than a value of drop of voltage during the temporary gradual decrease which may be caused after the predetermined time has elapsed. Therefore, the present invention is operable to prevent such a mistake that the charging operation is accidentally stopped for the reason that the temporary abrupt variations produced immediately after starting of the charging operation of the over-discharged battery are taken as the decrease produced after the battery has been fully charged. Further, since the determination of $-dV$ is not inhibited during this period, the excessive charge of the battery may not be caused even if the already charged battery has been accidentally recharged.

In case of the proper charging operation, the decrease in the battery voltage is apparent after the predetermined time has elapsed, and therefore, the first predetermined value having a smaller absolute value is incorporated as the reference value for determination of $-dV$. Thus, the charging operation is stopped when the battery voltage has been decreased after a short time from full charging of the battery, so that the excessive charge can be reliably prevented.

The advantage of the present invention is that the charging operation for the over-discharged battery may not be stopped at the beginning of the charging operation since, during the temporary gradual decrease in the battery voltage (line part A2 in FIG. 5) which may be apparent immediately after starting of the charging operation, the charging operation may not be stopped unless the drop in the voltage exceeds the second predetermined value having a larger absolute value. Further, in case that the already charged battery has been accidentally recharged, the excessive charge may not be caused since the charge stop operation based on the decrease in the voltage is not inhibited. Additionally, the charging operation is promptly stopped after the battery has been fully charged, so that the excessive charge can be reliably prevented. Thus, with the present invention, the excessive charge or short of charge can be reliably prevented, so that the life of the battery can be extended.

DETAILED DESCRIPTION OF THE PREFERRED EMBODIMENT

An embodiment of the present invention will now be explained with reference to the accompanying drawings.

Figure 2:
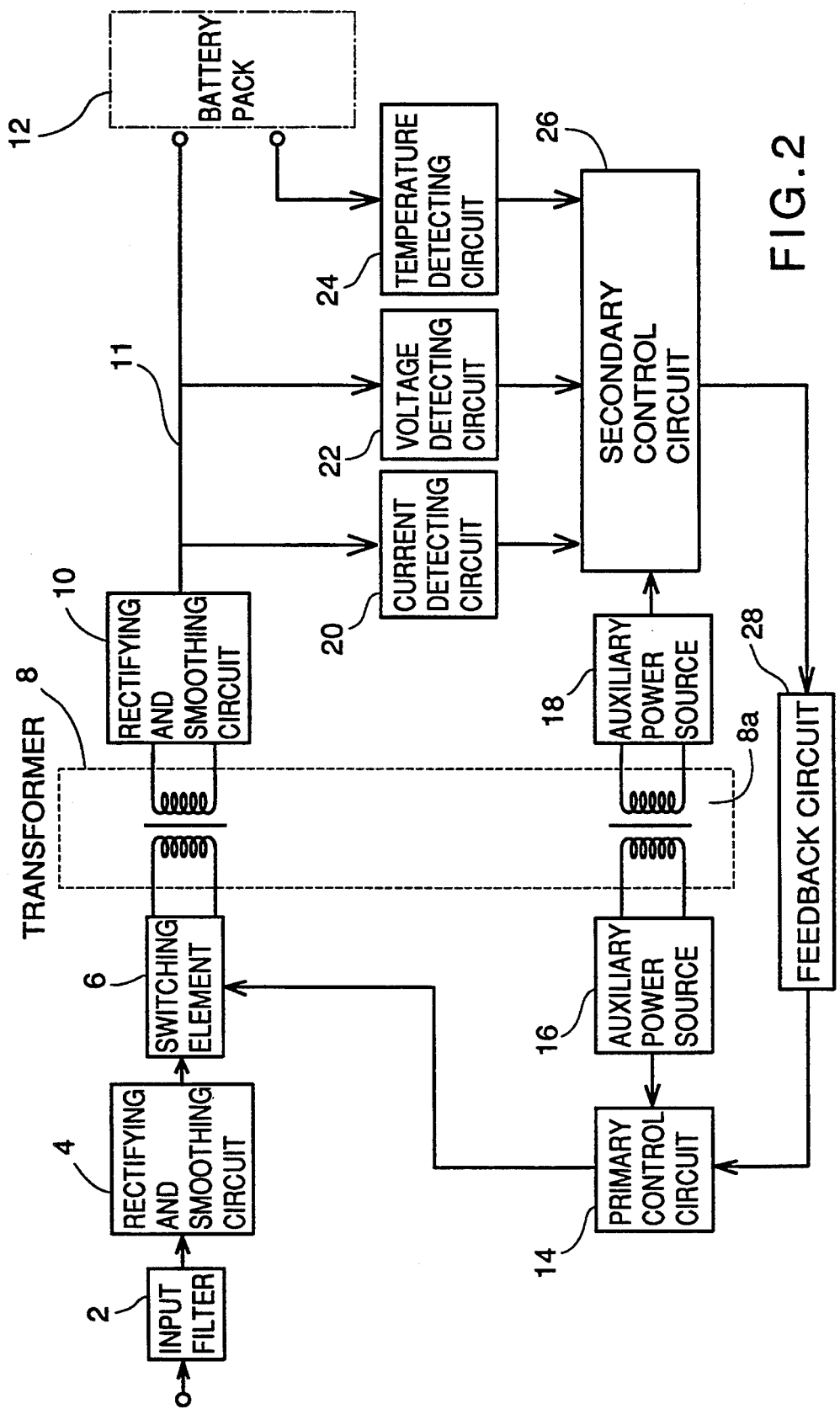
FIG. 2 is a block diagram showing a system of a battery charger according to an embodiment of the present invention.

Referring to FIG. 2, a system of a battery charger of this embodiment is shown in a block diagram. The current supplied from a commercial power source (not shown) is passed through an input filter 2 for eliminating noises and is thereafter rectified and smoothed by a rectifying and smoothing circuit 4. A switching element 6 is connected between the rectifying and smoothing circuit 4 and a transformer 8 and performs an ON/OFF control of the current flowing out of the rectifying and smoothing circuit 4. The transformer 8 includes an auxiliary coil 8a from which an electromotive force is supplied to an auxiliary power source 16 and is further to a primary control circuit 14. The primary control circuit 14 controls on and off of the switching element 6, so that the switching element 6 is provided for duty ratio control of the charging current. The transformer 8 serves to drop the voltage of the power from the commercial power source so as to supply an appropriate charging voltage.

The output from the transformer 8 is rectified and smoothed by a rectifying and smoothing circuit 10 and is thereafter supplied to a battery pack 12 through a charging current supply line 11, so that the charging current is applied to a battery (not shown) accommodated within the battery pack 12. A charging current detecting circuit 20 and a charging voltage detecting circuit 22 are connected to the charging current supply line 11 and serve to supply a charging current signal and a charging voltage signal to a secondary control circuit 26, respectively. A temperature detecting circuit 24 is disposed adjacent the battery pack 12 and serves to supply a temperature signal to the secondary control circuit 26.

The secondary control circuit 26 receives a supply of power from an auxiliary power source 18. Based on the charging current signal, the charging voltage signal and the temperature signal, the secondary control circuit 26 determines as to whether the duty ratio is to be increased. According to this determination, the secondary control circuit 26 outputs a duty ratio signal to the primary control circuit 14 via a feedback circuit 28.

Figure 3:
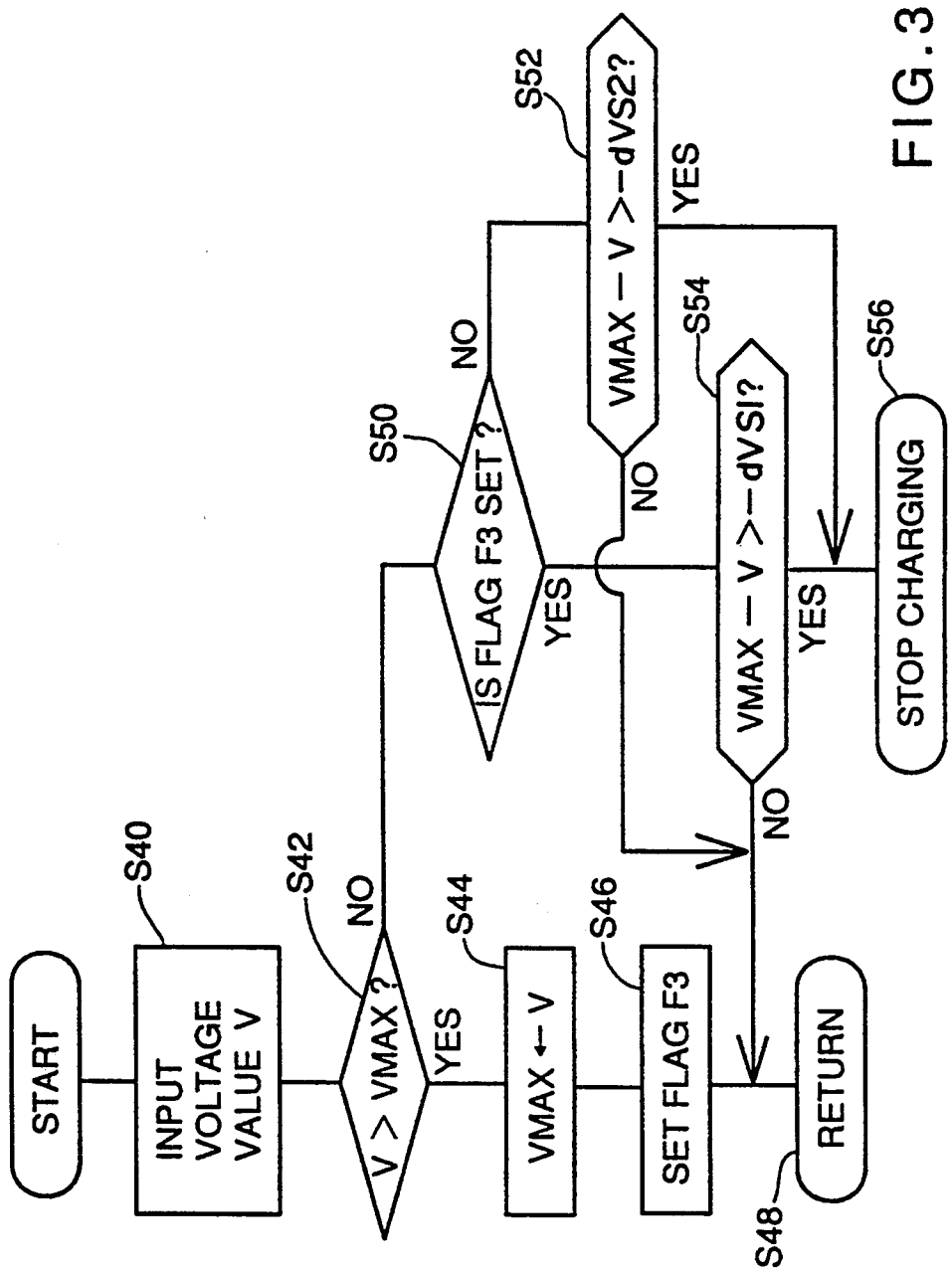
FIG. 3 is a block diagram showing a first process performed by the battery charger of the embodiment.

FIG. 3 shows a first process performed by the secondary control circuit 26. Here, the process of FIG. 3 is programmed such that the process is not performed until predetermined time T1 elapses after starting the charging operation, and that the process is performed at intervals of a time dT1 after the predetermined time T1 has elapsed. As indicated by line A in FIG. 5, when an over-discharged battery is charged, the battery voltage once abruptly increases (see line part A4) and then abruptly decreases (see line part A6) with time at the beginning of the charging operation. The battery voltage thereafter gently decreases (line part A2) and subsequently gently increases (see line part A5). The predetermined time T1 is determined such that, when the predetermined time T1 elapses, the battery voltage starts to gently increase after diminishing of the abrupt decrease (line part A6). Further, the time dT1 is determined to be a very short time. In Step S40 shown in FIG. 3, the battery voltage at that time is read and is stored as battery voltage V. The battery voltage V is then compared with maximum battery voltage VMAX among battery voltage V read by that time in Step S42.

As described above, when the over-discharged battery is charged, the temporary abrupt increase and decrease in the battery voltage is diminished within the predetermined time T1, and the battery voltage has a decreasing tendency when the predetermined time T1 has elapsed. The battery voltage thereafter keeps the decreasing tendency for a while. When an already fully charged battery is recharged, the battery voltage also has the decreasing tendency when the predetermined time T1 elapses. The battery voltage thereafter keeps the decreasing tendency for a while. Therefore, when these batteries are charged, the determination in Step S42 becomes NO when the predetermined time T1 elapses. The determination is thereafter kept NO for a while. On the other hand, when the battery voltage has an increasing tendency as indicated by line C for a normal battery in FIG. 5, battery voltage V at that time becomes larger than maximum battery voltage VMAX detected by that time. Therefore, the determination in Step S42 in this case becomes YES. Then, maximum battery voltage VMAX is renewed to new one in Step S44 and flag F3 is set in Step S46. Thus, flag F3 is set at timing C1 in case of charging of the normal battery, while flag F3 is set at timing A1 in case of charging of the over-discharged or in case of recharging of the already fully charged battery. This means that flag F3 is never set before reaching the timing A1 in case of the over-discharged or already charged battery.

The determination in Step S42 becomes NO when the battery voltage has the decreasing tendency. Such decreasing tendency appears in the period of line part B2 in the course of recharging of the already charged battery, in the period of line part A2 for the temporary decrease at the beginning of the charging operation of the over-discharged battery, and in the period of line part C3 or A3 after the battery has been fully charged. Here, in case of the line part B2 or A2, flag F3 is not set at this period, while flag F3 has been set in case of the line part C3 or A3. Therefore, Step S52 shown in FIG. 3 is then performed for the voltage decreasing period of line part A2 or B2, while Step S54 is performed for the voltage decreasing period of line part A3 or C3. Thus, in case of the decreasing period of line part A3 or C3 following the increasing period after the predetermined time T1 has elapsed, the value of VMAX−V is compared with a first predetermined value (−dVS1) in Step S54, while in case of the voltage decreasing period of line part A2 or B2 after the predetermined time T1 has elapsed but before reaching the increasing period, the value of VMAX - V is compared with a second predetermined value (−dVS2) in Step S52. Here, the absolute value of the first predetermined value −dVS1 is determined to be smaller than that of the second predetermined value −dVS2. Further, the absolute value of the second predetermined value −dVS1 is determined to be larger than the absolute value of −dV (voltage drop during the temporary gentle decrease in case of the over-discharged battery shown in FIG. 5). Therefore, the charging operation may not be stopped during the decreasing period of line part A2. On the other hand, the charging operation is stopped when the battery voltage has been dropped by the value of second predetermined value −dVS2 during the period of the line part B2 for the already charged battery. Thus, the charging operation may be stopped before the timing A1 in this case. In case of the period of line part A3 or C3, the comparison is performed with respect to the first predetermined value −dVS1 having a smaller value, so that the charging operation can be stopped immediately after reaching the peak voltage.

A second process performed by the secondary control circuit 26 will now be explained with reference to FIG. 4. In Step S2, determination is performed as to whether the predetermined time T1 has elapsed after starting the charging operation. If the predetermined time T1 has not elapsed, the process proceeds to Step S34 and skips the intervening steps between Steps S2 and S34. As previously described, the predetermined time T1 is determined such that, when the predetermined time T1 elapses, the battery voltage starts to gently increase after diminishing of the abrupt decrease (line part A6) for the charging operation of the over-discharged battery. Thus, the predetermined time T1 is slightly longer than the time when the temporary abrupt variation in the battery voltage is substantially diminished.

Figure 4:
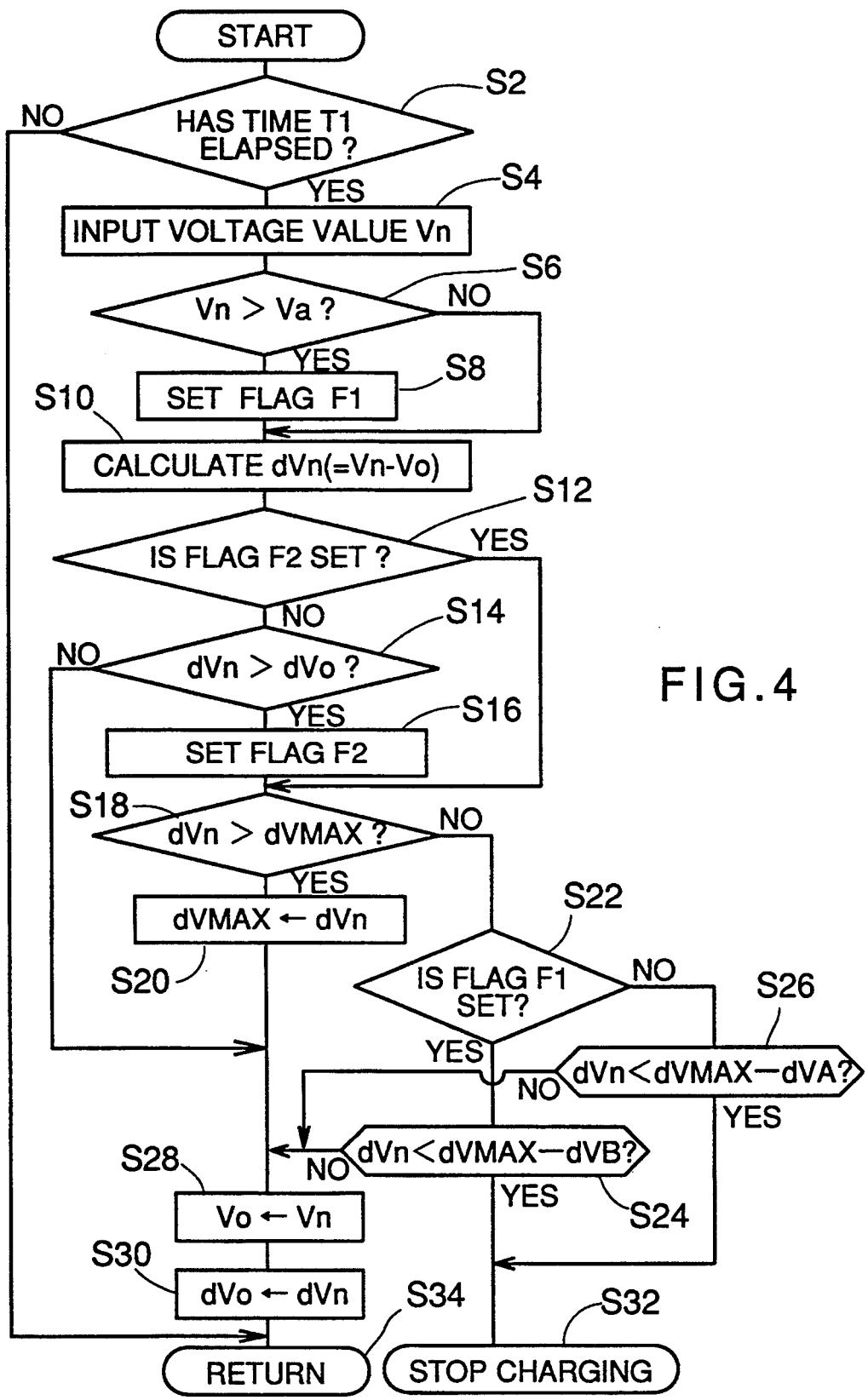
FIG. 4 is a block diagram showing a second process performed by the battery charger of the embodiment.

Step S4 and its subsequent steps shown in FIG. 4 are performed at intervals of time dT1 after the predetermined time T1 has elapsed. Here, the time dT1 is determined to be relatively short time. The process proceeds from Step S4 to Step S6 in which battery voltage Vn is compared with a predetermined value Va. The predetermined value Va has a value for distinguishing the battery as to whether the rating voltage of the battery is 12 V or less than 12 V. If the rating voltage is 12 V, the determination in Step S6 becomes YES while the determination becomes NO if the rating voltage is 9.6 V or 7.2 V. In case that the rating voltage is 12 V, the process proceeds to Step S8 in which flag F1 is set. In case that the rating voltage is 9.6 V or 7.2 V, the process skips Step S8 and flag F1 is not set.

Figure 5:
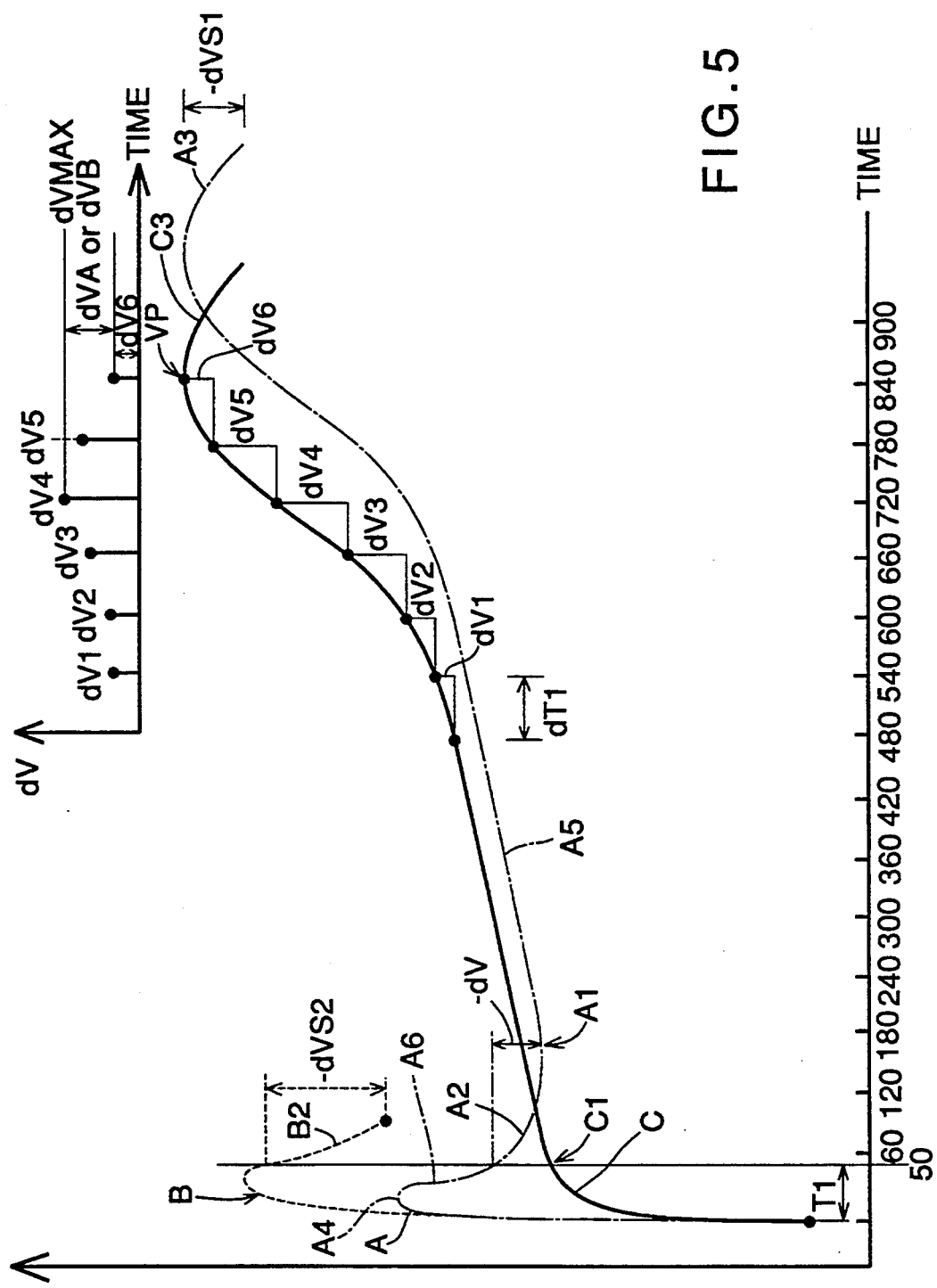
FIG. 5 is a graph showing the operation of the first and second processes.

The process proceeds from Step S8 to Step S10 in which the variation from battery voltage Vo produced before that time by dT1 to battery voltage Vn produced at that time is calculated and is stored as variation dVn which corresponds to dVn in FIG. 5. The values of the affixed numerals in FIG. 5 are incorporated for convenience's sake, and the time is shown by an enlarged scale.

Figure 1:
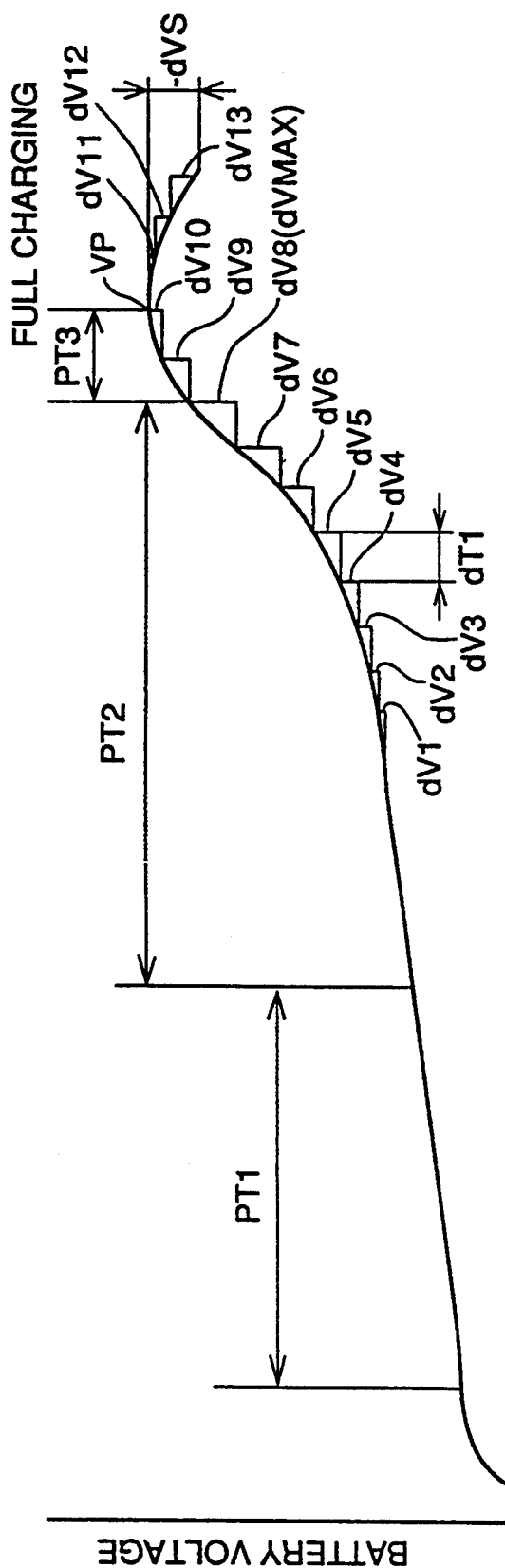
FIG. 1 is a graph showing variation in the battery voltage during the charging operation of a battery.

The process further proceeds to Step S12 in which determination is performed as to whether flag F2 has been set or not. This flag F2 is set in Step S16 when the relationship dVn>dVo results or when variation dVn produced at that time during predetermined period dT1 exceeds variation dVn produced just before. In case of the example shown in FIG. 1, the variation dVn during predetermined period dT1 is relatively small if it is obtained for period PT1, while the variation dVn becomes larger when reaching period PT2 or the rate of increase in the battery voltage is raised. Thus, flag F2 is set after reaching period PT2.

Step S14 is performed at intervals of time dT1 when the charging operation is performed during period PT1 and flag F2 is not set. When the charging operation proceeds from period PT1 to PT2 and flag F2 is set, the process skips Steps S14 and S16.

When the rate of increase in the battery voltage has started to raise after reaching period PT2, Step S18 and its subsequent steps are performed. In Step S18, determination is performed as to whether variation dVn at that time is larger than maximum variation dVMAX by that time. During the period dV1–dV2–dV3–dV4 in FIG. 5, variation dVn at that time is larger than maximum variation dVMAX by that time, and therefore, the process proceeds to Step S20 in which maximum variation dVMAX is renewed. During the period dV4–dV5 in FIG. 5, the determination in Step S18 becomes NO. Thus, the process proceeds to Step S22 after variation dVn has become to correspond to maximum variation dVMAX.

Step S22 performs distinction as to whether the battery is that having the rating voltage of 12 V or that having the rating voltage of 9.6 V or 7.2 V. In case of the battery having the rating voltage of 12 V, the process proceeds to Step S24 in which determination is performed as to whether variation dVn at that time is less than the value of subtraction of predetermined value dVB from maximum variation dVMAX obtained by that time. As shown in FIG. 5, predetermined value dVB is determined such that the battery is fully charged when variation dVn reaches the value smaller than maximum variation dVMAX (dV6 in this case) by such predetermined value dVB. Thus, the determination in Step S24 becomes NO when variation is dV5 while the determination becomes YES when variation is dV6. When the determination in Step S24 has become YES, the process proceeds to Step S32 for stopping supply of the charging current.

In case of the battery having the rating voltage of 9.6 V or 7.2 V, the determination in Step S22 becomes NO, and the process proceeds to Step S26 in which determination is performed as to whether variation dVn at that time is less than the value of subtraction of predetermined value dVA from maximum variation dVMAX obtained by that time. Here, predetermined value dVA is determined such that the battery having the rating voltage of 9.6 V or 7.2 V is fully charged when variation dVn reaches the value smaller than maximum variation dVMAX by such predetermined value dVA. Thus, predetermined values dVA and dVB are selectively incorporated according to the rating voltage of the battery to be charged, so that the charging operation can be stopped at a timing nearly equal to the timing of full charge of the battery in case of charging of any types of battery.

As long as the battery is still charged, battery voltage Vo and variation dVo both obtained just before are in turn renewed to new ones in Steps S28 and S30 for further process. As described above, the process for stopping the charging operation is performed when variation dVn has become less than the subtraction of predetermined value dVA or dVB from maximum variation dVMAX. Further, the process for storing maximum variation dVMAX is performed in Steps S18 and S20.

With this embodiment, Step S56 in FIG. 3 and Step S32 in FIG. 4 are independently performed from each other. Here, Step S32 and its subsequent steps in FIG. 4 are performed, prior to Step S56, for normally stopping the charging operation when the battery voltage reaches substantially the peak voltage. If the charging operation may not be stopped for some reason or other, the charging operation is then stopped by Step S56 and its subsequent steps.

Figure 6:
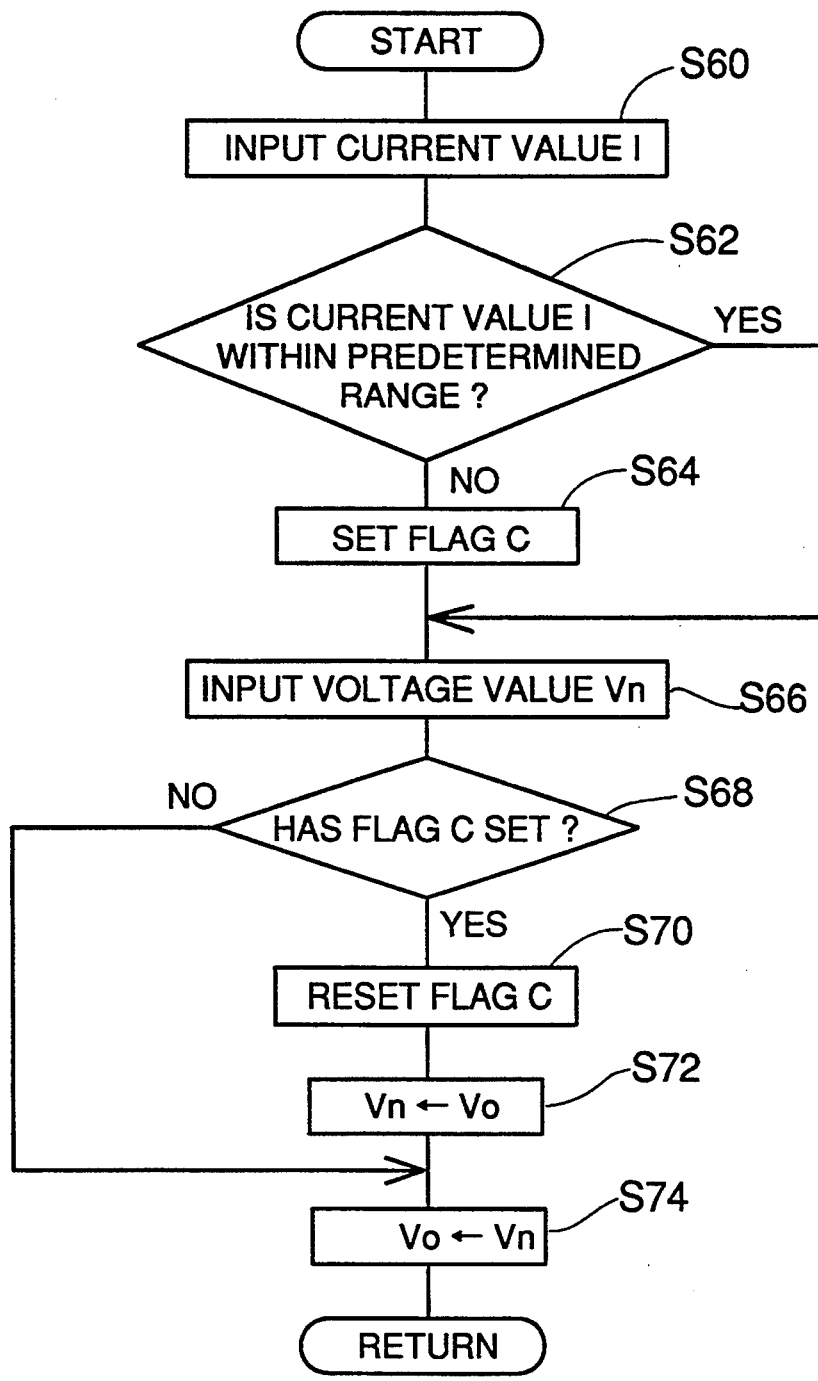
FIG. 6 is a block diagram showing a third process performed by the embodiment.

Additionally, a process shown in FIG. 6 is incorporated in order to prevent Step S40 in FIG. 3 or Step S4 in FIG. 4 from entrance of extraordinary battery voltage which may be temporarily produced because of variation in the power source voltage, etc. This process is programmed to be performed at intervals of very short time of period.

Figure 7:
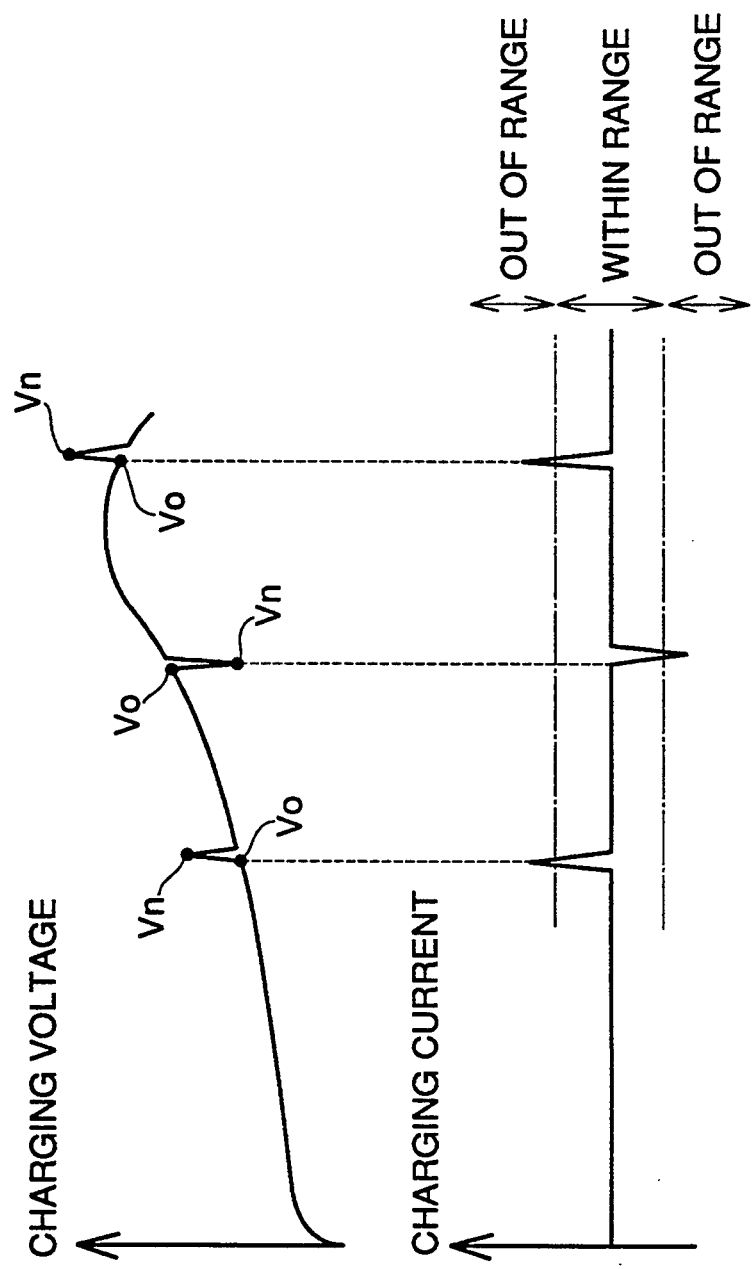
FIG. 7 is a graph showing the operation of the third process.

In this process, value I of the charging current is inputted in Step S60. The process then proceeds to Step S62 in which determination is performed as to whether value I is within a predetermined range. As shown in FIG. 7, the charging current is normally controlled to have a predetermined current value. However, the value of the charging current may be varied from the predetermined current value and may become out of an allowable range when the substantial variation in the power source voltage, etc. has been caused.

When value I is out of the allowable range, the determination in Step S62 becomes NO, and the process proceeds to Step S64 in which flag C is set.

The process further proceeds to Step S68 via Step S66. In Step S68, determination is performed as to whether flag C has set or not. If the determination is NO, battery voltage Vn inputted in Step S66 is utilized as it is for further process. On the other hand, if value I is out of the allowable range, the process proceeds to Step S72 in which battery voltage Vo obtained just before is incorporated as battery voltage Vn at that time. Further, battery voltage Vo is in turn renewed to new one in Step S74. With this process, battery voltage Vn at that time is replaced by battery voltage Vo obtained just before, so that influence of noises may not directly reflect on the control of stopping of the charging operation.

While the invention has been described with reference to a preferred embodiment, it is to be understood that modifications or variation may be easily made without departing from the spirit of this invention which is defined by the appended claims.

What is claimed is:

1. A battery charger comprising:
   means for monitoring a battery voltage during supply of a charging current to a battery; and
   means for stopping the supply of the charging current when the battery voltage is decreased by a predetermined value after the battery voltage has reached its maximum value;
   said predetermined value being selected from a first predetermined value and a second predetermined value;
   said first predetermined value being adopted as said predetermined value when an increasing tendency of the battery voltage is detected after a predetermined time has elapsed from starting of the charging operation;
   said second predetermined value being adopted as said predetermined value until the increasing tendency of the battery voltage is detected after the predetermined time has elapsed from starting of the charging operation;
   an absolute value of said first predetermined value being smaller than an absolute value of said second predetermined value; and
   said predetermined time being determined to be longer than a period of duration of temporary abrupt variation in the battery voltage which may be produced at beginning of the charging operation of an over-discharged battery.

2. The battery charger as defined in claim 1, further comprising:
   means for temporarily storing the monitored battery voltage and for monitoring the charging current; and means for incorporating, in place of the battery voltage produced at that time when the charging current is out of a predetermined range, the battery voltage produced just before that time and produced when the charging current is within said predetermined range.

3. The battery charger as defined in claim 1, further comprising:

means for monitoring variation in the battery voltage at intervals of a second predetermined time;

means for extracting and storing a maximum variation from the monitored variation; and means for stopping the supply of the charging current when the monitored variation has become less than a value of subtraction of a third predetermined value from the maximum variation.

* * * * *